June 18, 1963    J. E. EILERSEN    3,093,860

ADJUSTABLE EXTRUDING DIE

Filed March 16, 1961

INVENTOR.
JACK E. EILERSEN
BY
ATTY.

United States Patent Office 3,093,860
Patented June 18, 1963

3,093,860
ADJUSTABLE EXTRUDING DIE
Jack E. Eilersen, Alameda, Calif., assignor to Oliver Tire & Rubber Company, Oakland, Calif., a corporation of California
Filed Mar. 16, 1961, Ser. No. 96,324
5 Claims. (Cl. 18—12)

This invention relates to forming dies for tread rubber extrusion machines and in particular it relates to an adjustable forming die capable of making various sizes of tread rubber.

In the tire art, camelback or tread rubber has long been made by tuber machines which extrude the rubber composition through a die opening to form the tread rubber into the desired size and shape. Generally speaking, tread rubber has a trapezoidal shape in cross-section with sloping sides from the crown to the base which form integral, opposite, wing portions. The wing portions are folded down over the tire sidewalls when the tread rubber is used in recapping a tire. Today, such tread rubber must be made in many various sizes in order to accommodate the many different types and sizes of vehicle tires presently in use.

Prior to my invention, in manufacturing tread rubber it was necessary to use a separate die for each production run of tread rubber having a particular size or shape, or to use a complicated die system wherein a plurality of die blocks were adjusted vertically to approximate the desired shape of camelback. The latter method required the use of trim knives, which in shaping the sloped sides of the camelback, created the problem of handling the trimmed waste material. With the separate fixed dies, when a slightly different size of tread rubber was to be produced, it was necessary to stop the tuber machine, remove the die plate from the tuber outlet, and replace it with the die plate of the correct size. Not only was this inefficient and expensive due to the loss of production time, but it also made it necessary for the tread rubber manufacturers to maintain a large inventory of die plates of various sizes. The maintenance of a large stock of plates was expensive and there was always the possibility that the particular plate needed was misplaced or otherwise unavailable.

Another disadvantage with the fixed die plates was that they afforded no means for small adjustments in the thickness of the tread rubber and in the taper of the wing portions of the tread rubber.

These problems have been solved by the present invention which has for one of its objects to provide a forming die for an extrusion machine which can be adjusted to provide tread rubber having different sizes and shapes.

Another object is to provide a forming die for rubber extrusion machines having a die opening that can be adjusted while the extrusion machine or tuber is operating.

Another object of the invention is to provide an adjustable extrusion die mechanism wherein the end members are automatically adjusted for uniform slope angle as the height of the die opening is varied.

Other objects and advantages of my invention will become apparent from the following description. The illustrative embodiments set out in the drawings and described in detail herein is not intended to limit the scope of the invention as described in the appended claims, but rather is intended to comply with 35 USC 112.

Figure 1:
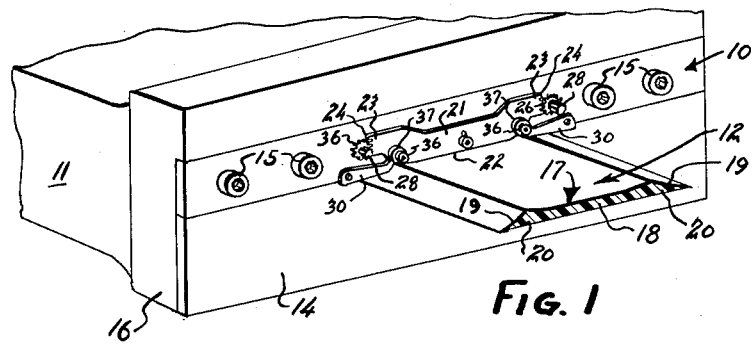
FIG. 1 is a view in perspective of an adjustable die plate embodying the principles of the present invention shown attached to the outlet head of an extruding apparatus.

In the drawings an adjustable die plate 10 embodying the principles of my invention is shown in FIG. 1 as it appears when attached to a tuber or extrusion apparatus 11. The tuber 11 supplies the rubber composition material which is forced through the die plate 10 to form a strip of camelback 12 or tread rubber having a uniform cross-section. A typical tuber apparatus of the well known type is shown in greater detail in my co-pending application Serial No. 115,262 entitled "Apparatus for Forming Composite Camelback" which was filed on June 6, 1961.

Figure 4:
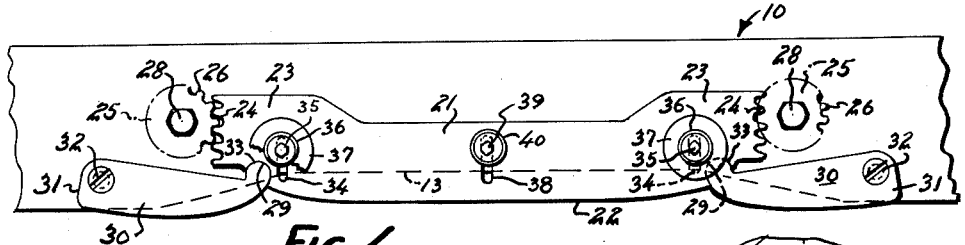
FIG. 4 is an enlarged fragmentary view of the adjustable die plate of FIG. 2 showing the center gate member in the low position.
Figure 5:
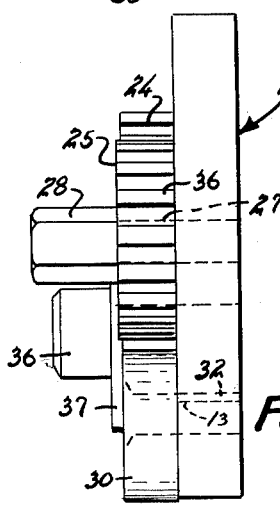
FIG. 5 is an enlarged end view taken along line 5—5 of FIG. 2.
Figure 6:
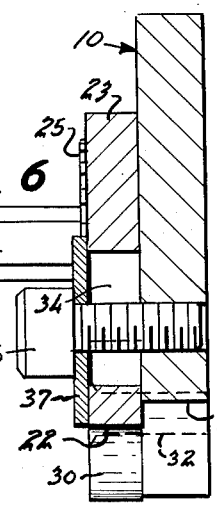
FIG. 6 is an enlarged view in end elevation and in section taken along the line 6—6 of FIG. 2.
Figure 7:
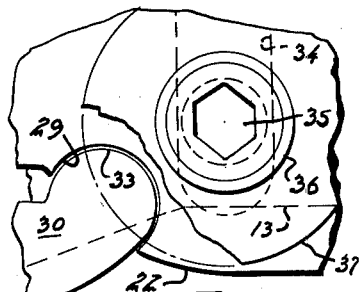
FIG. 7 is an enlarged fragmentary view in elevation showing a connecting socket between the pivoting side plate and the center gate.

The die plate 10 has a generally rectangular shape with a centrally located cutout portion 13 as shown by the dotted lines in FIG. 4. It is normally attached on top of the base die plate 14 by bolts 15 to the flanged outlet end 16 of the tuber 11, the cutout portion 13 and the base die plate 14 normally forming a die opening which determines the cross-sectional shape of the camelback 12.

In general, it is desired that the extruding camelback or tread rubber have a trapezoidal shape in cross-section with parallel upper crown and lower base surfaces 17 and 18, and side edges 19 which are sloped at the same angle downwardly from the crown 17 to the base surface 18 and which thus form the wing portions 20 of the tread rubber 12 which fold down over the side walls of the tire when it is recapped. In my invention, the thickness of the tread rubber 12 between the crown and the base 17 and 18 is controlled by a center gate 21 which is attached to the die plate 10 in such a manner that it can be raised or lowered across the die plate cutout portion 13 adjacent the base die plate 14.

Figure 2:
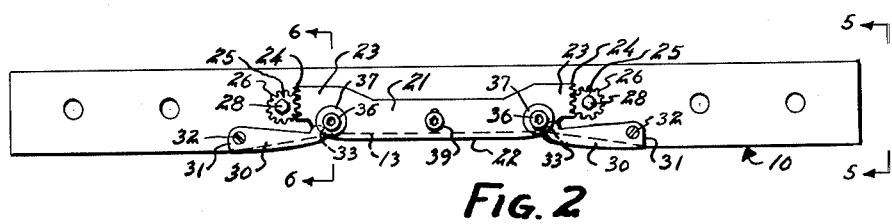
FIG. 2 is a view in elevation of an adjustable die plate according to the invention.
Figure 3:
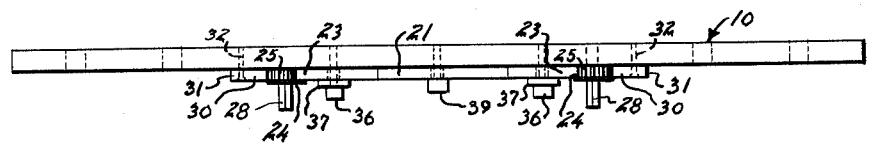
FIG. 3 is a plan view of the adjustable die plate shown in FIG. 2.

As shown in FIG. 2, the center gate 21 of the die plate 10 has a substantially straight, horizontal, lower edge 22 that forms a smooth surface on the camelback 12 as it passes through the die 10. At each end of the center gate 21 is an integral extended end portion 23 having a rack of fixed gear teeth 24. Mounted adjacent each end portion 23 is a rotatable gear wheel 25 having gear teeth 26. Each gear wheel 25 is mounted on a shaft 27 and is so positioned that its teeth 25 will mesh with the rack gear teeth on each end portion 23. Fixed to the end of each shaft 27 is a suitable torquing means to enable the shaft 27 to be turned easily, such as a hex nut 28.

Near both ends of the lower edge 22 of the center gate member 21 are circular cutout portions which form sockets 29, and movably mounted within each of the sockets 29 is a pivoting side plate 30 which serves to form the sloped side edges 19 of the extruded camelback 12. Each side plate 30 is pivotally mounted at its lower end 31 to the die plate 10 by a shaft 32 which is tapped into the die plate 10 at a fixed position. The upper end of each side plate 30 has an enlarged, mounted portion 33 which fits with an easy sliding clearance within the socket 29 of the central gate 21.

Near each socket 29 and the center gate 21 is a slot 34 of uniform width, whose length represents the amount of travel of the center gate 21 during the adjustment of the die. The longitudinal axis of each slot 34 extends vertically and lies parallel to the racks of gear teeth 24 on the center gate member 21. Through each slot 34 is a cap screw 35 which is tapped into the die block 10. Each screw 35 has a first fixed washer 36 at its head end which bears against the second larger washer 37 that covers a substantial area on both the center gate 21 and a pivoting side plate 30. The larger washer 37 acts as a pressure plate and when the cap screw 35 is screwed within the die plate 10, the washer 37 is pressed against the center gate 21 and the side plate 30 to hold them in their predetermined positions on the die plate 10. The cap screws 35 are screwed into the die plate 10 with a pre-set tensioning against the center gate 21 so that by virtue of the slots 34, the center gate 21 can be moved upward and downward on the die plate 10 by turning the gear wheels 25. To provide an additional means for retaining the center gate 21 and the die plate 10 I may provide a third slot 38 near the middle of the center gate 21. A cap screw 39 having a diameter slightly less than the slot width is located through the slot 38 and tapped in the die plate 10 so that it can tighten a washer 40 against the center gate 21 to help the washers 37 hold it in position on the die plate 10 during the extrusion operation.

In operation, the die plate 10 is attached to the outlet end 16 of a tuber or extrusion device 11 by the bolts 15 as shown in FIG. 1. With the cap screws 35 and 39 tightened to the proper tension, the adjusting gear wheels 25 may be turned, using a small wrench. Movement of the gear wheels 25 with the teeth 26 meshed with the rack gear teeth 24 causes the center gate 21 to be adjusted upward or downward to the desired level. As the center gate 21 is raised or lowered, each side plate 30 is moved up or down while pivoting about its fixed pivotal end 31. During this movement, the rounded end 33 of each end plate 30 has a rotational movement within the socket 29 of the center gate 21, and each socket 29 has ample clearance so that the rounded end 33 will not bind therein at any point during its travel. When the center gate 21 is adjusted to the level which gives the desired thickness of the camelback material being extruded, it will remain in this position by virtue of the cap screws 35 and 39 and the rubber being extruded. Small adjustments in the camelback thickness can be made when the extrusion process is taking place by merely turning the hex nuts 28 to effect the desired movement of the center gate 21. The gears 25 provide a means for moving the center gate 21 in small increments by a large mechanical advantage so that the adjustment is positive and easy to perform. As the center gate 21 is raised or lowered, end plates 30 automatically adjust their slope to the proper angle so that the extruding camelback 12 has the desired shape of a symmetrical trapezoid with evenly sloped wing portions.

To those skilled in the art to which this invention relates, many changes in construction and widely differing embodiments and applications of the invention will suggest themselves without departing from the spirit and scope of the inveniton. The disclosures and the description herein are purely illustrative and are not intended to be in any sense limiting.

I claim:

1. An adjustable die for use on an extruding apparatus, said die comprising: a die plate having a cutout portion forming an opening therethrough; an adjustable center gate member on said die plate adjacent said opening; means for moving said center gate member across said cutout portion to vary the size of said exit opening; and side plate means pivotally attached to said die plate and to said center gate member and movable in response to movement of said center gate member for varying the slope of opposite sides of said opening.

2. An adjustable die for use on an extruding apparatus for making tread rubber of varying sizes having generally a trapezoidal cross-section with integral, opposite wing portions of uniform, equal taper, said die comprising: a die plate having a central cutout portion forming an opening therethrough; an adjustable center gate member on said die plate adjacent said opening and having a rack of gear teeth; a rotatable gear wheel having teeth adapted to mesh with said rack gear teeth; side plate members pivotally attached to said die plate and to said center gate member, said side plate members being movable in response to movement of said center gate member for varying the slope of the opposite side of said opening; and means to retain said center gate member and said side plate members on said die plate.

3. An adjustable die for use on an extruding apparatus for making tread rubber of varying sizes having generally a trapezoidal cross-section with integral, opposite wing portions of uniform, equal taper, said die comprising: a die plate having a cutout portion forming an opening therethrough; an adjustable center gate member on said die plate adjacent said opening and having a rack of gear teeth at each of its ends; a rotatable gear wheel having teeth adapted to mesh with said rack gear teeth for moving said center gate member upward or downward; side plate members pivotally attached to said die plate and to said center gate member, said side plate members being movable in response to movement of said center gate member for varying the slope of the opposite sides of said opening; said center gate member having slot means parallel to said racks of gear teeth, pressure plate means adjacent said slot means and covering a portion of said center gate member and a said side plate member; and bolt means extending through said pressure plate means and said slot means and into said die plate for retaining said pressure plate means, said center gate member and said side plate members against said die plate.

4. An adjustable die for use on an extruding apparatus, said die comprising: a die plate having a cutout portion forming an opening therethrough; an adjustable center gate member on said die plate adjacent said opening, said center gate member having cutout portions forming pivotal sockets; means for moving said center gate upward and downward to vary the size of said exit opening; side plate means having fixed pivot connections on said die plate and free end portions adapted to fit within said sockets on said center gate member, and being therefore movable in response to movement of said center gate member for varying the slope of opposite sides of said opening; and means for retaining said center gate member and said plate members in a predetermined fixed position on said die plate.

5. An adjustable die for use on an extruding apparatus for making tread rubber of varying sizes having generally a trapezoidal cross-section with integral, opposite wing portions of uniform, equal taper, said die comprising: a die plate having a cutout portion forming an opening therethrough; an adjustable center gate member on said die plate adjacent said opening, said center gate member having circular cutout portions forming pivotal sockets and having a rack of gear teeth at each of its ends; a rotatable gear wheel having teeth adapted to mesh with said rack gear teeth for moving said center gate member upward or downward; side plate members having fixed pivot connections on said die plate and free end portions adapted to fit within said sockets on said center gate member, said side plate members being therefore movable in response to movement of said center gate member for varying the slope of the opposite sides of said opening; said center gate member having slot means parallel to said racks of gear teeth, pressure plate means adjacent said slot means and covering a portion of said center gate member and a said side plate member; and bolt means extending through said pressure plate means and said slot means and into said die plate for retaining said pressure plate means, said center gate member and said side plate members against said die plate.

References Cited in the file of this patent

UNITED STATES PATENTS

| | | |
|---|---|---|
| 1,350,722 | Goodenberger | Aug. 24, 1920 |
| 2,720,679 | Ratliff | Oct. 18, 1955 |